United States Patent
Bang et al.

[11] Patent Number: 5,956,019
[45] Date of Patent: Sep. 21, 1999

[54] TOUCH-PAD CURSOR CONTROL DEVICE

[75] Inventors: Eric S. Bang, Seattle; Rebecca S. Mowry, Millcreek; Charles A. Pullen, Mercer Island, all of Wash.

[73] Assignee: The Boeing Company, Seattle, Wash.

[21] Appl. No.: 08/128,985

[22] Filed: Sep. 28, 1993

[51] Int. Cl.[6] .................................................. G09G 5/00
[52] U.S. Cl. .......................................... 345/173; 345/157
[58] Field of Search ................................ 345/1, 156, 173, 345/179, 159, 157; 340/815.1; 178/18, 19

[56] References Cited

U.S. PATENT DOCUMENTS

| | | | |
|---|---|---|---|
| 4,509,046 | 4/1985 | Yamada | 340/815.1 |
| 4,654,648 | 3/1987 | Herrington et al. | 345/179 |
| 4,847,605 | 7/1989 | Callahan et al. | 340/709 |
| 4,862,151 | 8/1989 | Grauz et al. | 340/706 |
| 4,899,138 | 2/1990 | Araki et al. | 340/712 |
| 4,917,516 | 4/1990 | Retter | 345/163 |
| 4,954,817 | 9/1990 | Levine | 345/156 |
| 4,973,176 | 11/1990 | Dietrich | 345/156 |
| 4,977,397 | 12/1990 | Kuo et al. | 178/18 |
| 4,983,786 | 1/1991 | Stevens et al. | 345/159 |
| 5,012,231 | 4/1991 | Felsenstein | 345/159 |
| 5,016,008 | 5/1991 | Gruaz et al. | 341/33 |
| 5,027,109 | 6/1991 | Donovan et al. | 340/706 |
| 5,214,421 | 5/1993 | Vernon et al. | 345/1 |
| 5,231,380 | 7/1993 | Logan | 345/156 |
| 5,250,929 | 10/1993 | Hoffman et al. | 345/173 |
| 5,250,930 | 10/1993 | Yoshida et al. | 345/173 |

FOREIGN PATENT DOCUMENTS

| | | | |
|---|---|---|---|
| 0069196 | 1/1983 | European Pat. Off. | 345/173 |
| 0419145 | 3/1991 | European Pat. Off. | 345/173 |
| 2 662 528 | 11/1991 | France . | |
| 0 490 712 A1 | 6/1992 | France . | |
| 359184925 | 10/1984 | Japan | 345/173 |

OTHER PUBLICATIONS

Touch Pad Product Catalog, Sextant Avionique, Flight Control Systems Division, 3 pages.

*Primary Examiner*—Matthew Luu
*Attorney, Agent, or Firm*—Christensen O'Connor Johnson & Kindness PLLC

[57] ABSTRACT

A cursor control device (20) suitable for use with a computer-controlled display (66) is disclosed. The cursor control device (20) includes a touch-pad controller (24) and interface electronics (22) that produce cursor control output signals (40) suitable for controlling the location of a cursor on the computer-controlled display (66). The touch-pad controller (24) includes a housing (28) having: (i) a base (39); (ii) a surface (41) that slopes upwardly from the base (39); and a pair of side walls (43) that extend from the base (39) to the sloped surface (41). The slope angle is greater than 10°, and preferably is greater than 20°. A touch sensitive pad (26) mounted in the sloped surface (41) senses the location of an object, such as a finger pressing against the touch sensitive pad (26). Further, a thumb switch (30) is mounted in one side wall (43) of the housing (28). The interface electronics (28) are coupled to the touch sensitive pad (26) and to the thumb switch (30) and determine the location and movement (distance and direction) of an object pressing against the touch sensitive pad (26) and the status of the thumb switch (30), The previously mentioned cursor control output signals (40) are produced by the interface electronics (22) based on the object location and movement determinations.

20 Claims, 11 Drawing Sheets

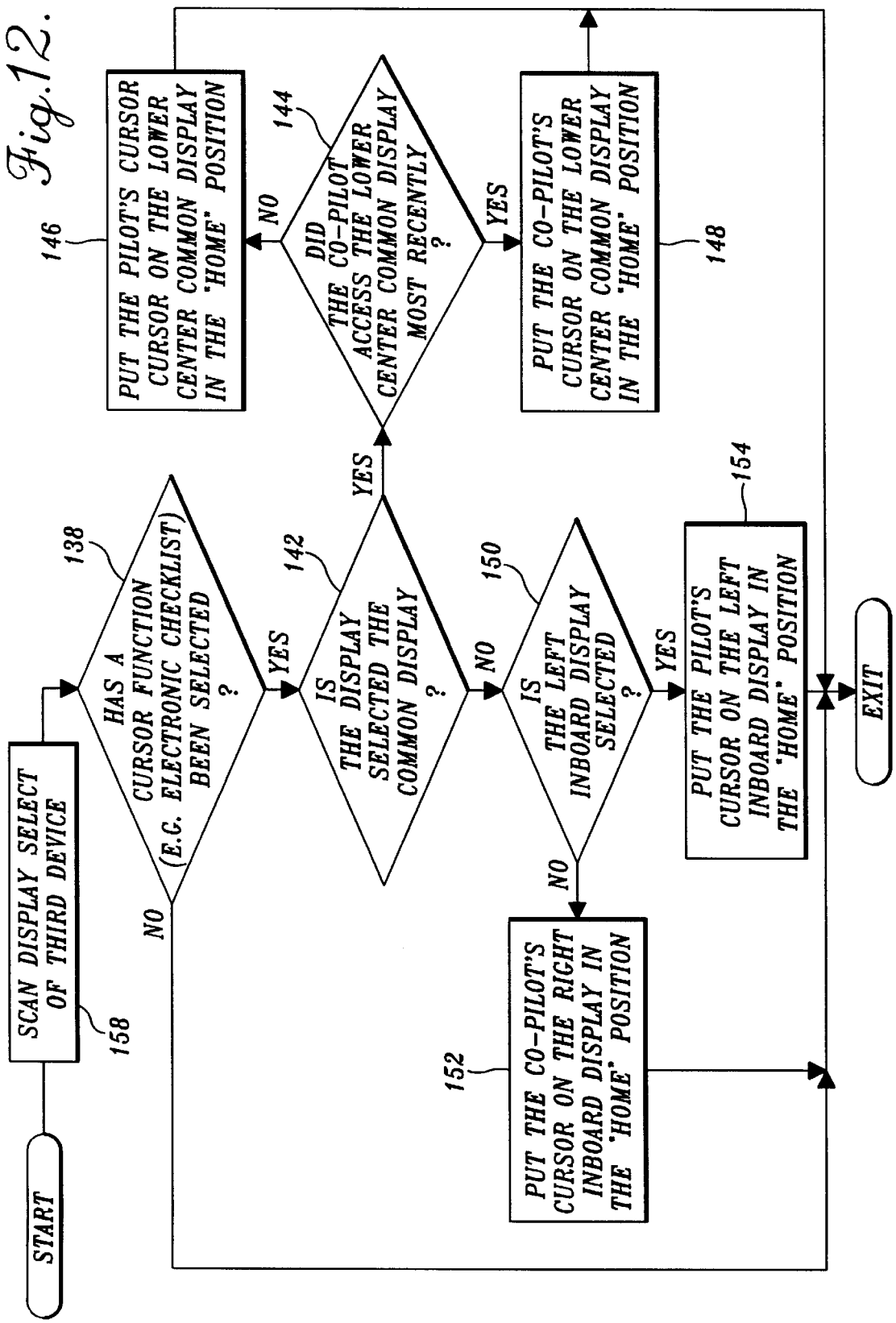

TOUCH-PAD CURSOR CONTROL DEVICE

FIELD OF THE INVENTION

The present invention relates to cursor control devices for computer-controlled display systems and, more particularly, to cursor control devices incorporating a touch sensitive pad.

BACKGROUND OF THE INVENTION

Software systems employing graphical user interfaces are virtually standard in modern computer operating systems. Key to the acceptance of a graphical user interface in new environments, such as on the flight deck of an airplane, are devices that allow a user to control the position of a cursor on the computer system display.

For some time, the cursor control device of choice for use with a graphical user interface has been the "mouse." In the most common mouse cursor control device, a ball is mounted in a housing so that part of the ball projects from the housing when the mouse is in its normal position of use. A user causes the ball to rotate relative to the housing by placing the projecting part of the ball against a surface, and dragging the device across the surface, so that the ball rotates due to the friction of the ball against the surface. The rotation of the ball controls an electrical signal that in turn controls the location of a cursor on a computer-controlled display.

The second most preferred type of cursor control device for use with a graphical user interface is probably the trackball. A trackball cursor control device corresponds to a mouse rotated vertically 180 degrees, or turned over, so that the user acts directly upon the ball to cause its rotation, rather than dragging the device across a surface. As there is no need to drag the trackball across a surface, typically the position of the housing for the trackball is fixed relative to the user.

While the foregoing cursor control devices are the preferred types, these devices have disadvantages when used on moving vehicles, such as aircraft. The principal problem is that loose components, such as a mouse, are undesirable on moving vehicles, because the components may move relative to the interior of the vehicle during accelerations of the vehicle, creating a hazard, and resulting in undesired cursor movement. This problem also arises with trackball cursor control devices, since acceleration of the vehicle can cause the trackball to rotate, particularly if a user's hand idly rests on the ball during changes in the speed or direction of the vehicle.

One proposed solution to the foregoing problem is to provide a touch sensitive display in moving vehicles. Cursor control is provided by the user touching the screen of the display with a finger. Touch-controlled displays (or overlays that provide the same function) have the advantage that there are no parts that can move independent of the user and cause undesired cursor movement.

Unfortunately, touch sensitive displays have four principal disadvantages.

First, the touch sensitive screen or overlay rapidly becomes obscured by fingerprints, and thus, so does the underlying display. Second, touch sensitive overlays are dedicated to one display. It is not possible to use a single touch sensitive overlay to control multiple displays. Third, touch sensitive displays or overlays operate in an "absolute" mode. Finger pressure on a touch sensitive screen causes the cursor to be moved to the display position lying beneath the location of the finger. In contrast, mouse and trackball cursor control devices operate in relative mode. The distance and direction a trackball rotates relative to a previous position is used to control the location of the cursor. While touch sensitive screens allow a cursor to be rapidly moved to a desired location, they are relatively imprecise due to the size of a user's finger. In contrast, a mouse or trackball is relatively precise because much smaller cursor movements can be accommodated. Fourth, vehicle acceleration can cause a user's fingers to move inadvertently when using a touch sensitive screen resulting in the cursor being moved to an undesired location.

The present invention provides a touch-pad cursor control device that provides a solution to the problems with prior art cursor control devices of the type described above.

SUMMARY OF THE INVENTION

In accordance with the present invention, a cursor control device suitable for use with a computer-controlled display is provided. The cursor control device includes a touch-pad controller and interface electronics that produce cursor control output signals suitable for controlling the location of a cursor on the computer-controlled display. The touch-pad controller includes a housing having: (i) a base; (ii) a surface that slopes upwardly from the base; and (iii) a pair of side walls that extend from the base to the sloped surface. The slope angle is greater than 10°, and preferably is greater than 20°. A touch sensitive pad mounted in the sloped surface senses the location of an object, such as a finger pressing against the pad. Further, a thumb switch is mounted in one side wall of the housing.

The interface electronics are coupled to the touch sensitive pad and to the thumb switch and determine the location and movement (distance and direction) of an object pressing against the touch sensitive pad, and the status of the thumb switch.

The cursor control output signals are produced by the interface electronics based on the object location and movement.

In accordance with other aspects of this invention, the rate of movement of an object, such as a finger, across the touch sensitive pad is used to control the rate of movement of the cursor on the display. The interface electronics scan the touch sensitive pad to determine the location of the object at a first time and at a second time. The object movement distance is then determined by comparing the object location at the first time with the object location at the second time. Thereafter, an approximate rate of change in the location of the object is determined by dividing the absolute value of the movement distance by a delta time, determined by subtracting the first time from the second time. Subsequently a gain is determined from a function that is dependent upon the approximate rate of change of the location of the object. Finally, object movement distance is multiplied by the gain to produce the cursor control output signals.

In accordance with further aspects of this invention, the cursor control device can also be used to reposition a cursor in a computer-controlled display in response to pressing the thumb switch. First, the interface electronics scans the touch-pad controller to determine if the thumb switch has been pressed. If the thumb switch has been pressed, the interface electronics determines whether the cursor is currently displayed within a first predefined area. Next, the interface electronics determines whether a second predefined area is associated with the first predefined area. If so, the interface electronics causes cursor control signals to display the cursor within the second predefined area.

In accordance with still other aspects of this invention, the cursor control device controls the location of the cursor on the computer-controlled display in an absolute mode, as well as in a relative mode. In the relative mode, as described above, the interface electronics determine the rate, distance, and direction of movement of an object, such as a finger, across the touch sensitive pad, and uses the rate, distance, and direction information to control the movement of the cursor on a computer-controlled display. In the absolute mode, the interface electronics determine if an object presses against one or more specific locations the first time object pressure is detected. If object pressure at the specific location occurs the first time object pressure is detected, the interface electronics moves the cursor to a corresponding location on the computer-controlled display.

In accordance with yet still other aspects of this invention, two cursor control devices formed in accordance with this invention can be selectively coupled to a common computer-controlled display. The cursor control device that controls the position of the cursor of the common display is determined by the interface electronics and the status of display select switches.

In accordance with yet further aspects of this invention, the touch-pad controller includes a plurality of display select switches, and the interface electronics are adapted to couple the touch pad controller to a selected one of a plurality of related computer-controlled displays determined by the status of the display select switches. Some of the computer-controlled displays may be common to another touch-pad controller. In this instance, when the display select switch on one of the touch-pad controllers associated with a common computer-controlled display is actuated, the interface electronics related thereto produce the signals that control the location of that cursor on the common computer-controlled display. If the display select switch of the other touch-pad controller is thereafter actuated, the interface electronics associated with that touch-pad controller produce the cursor control signals.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 12 is a flow chart showing third device monitoring logic suitable for use in the interface program of FIG. 6.

DETAILED DESCRIPTION OF THE PREFERRED EMBODIMENTS

Figure 1:
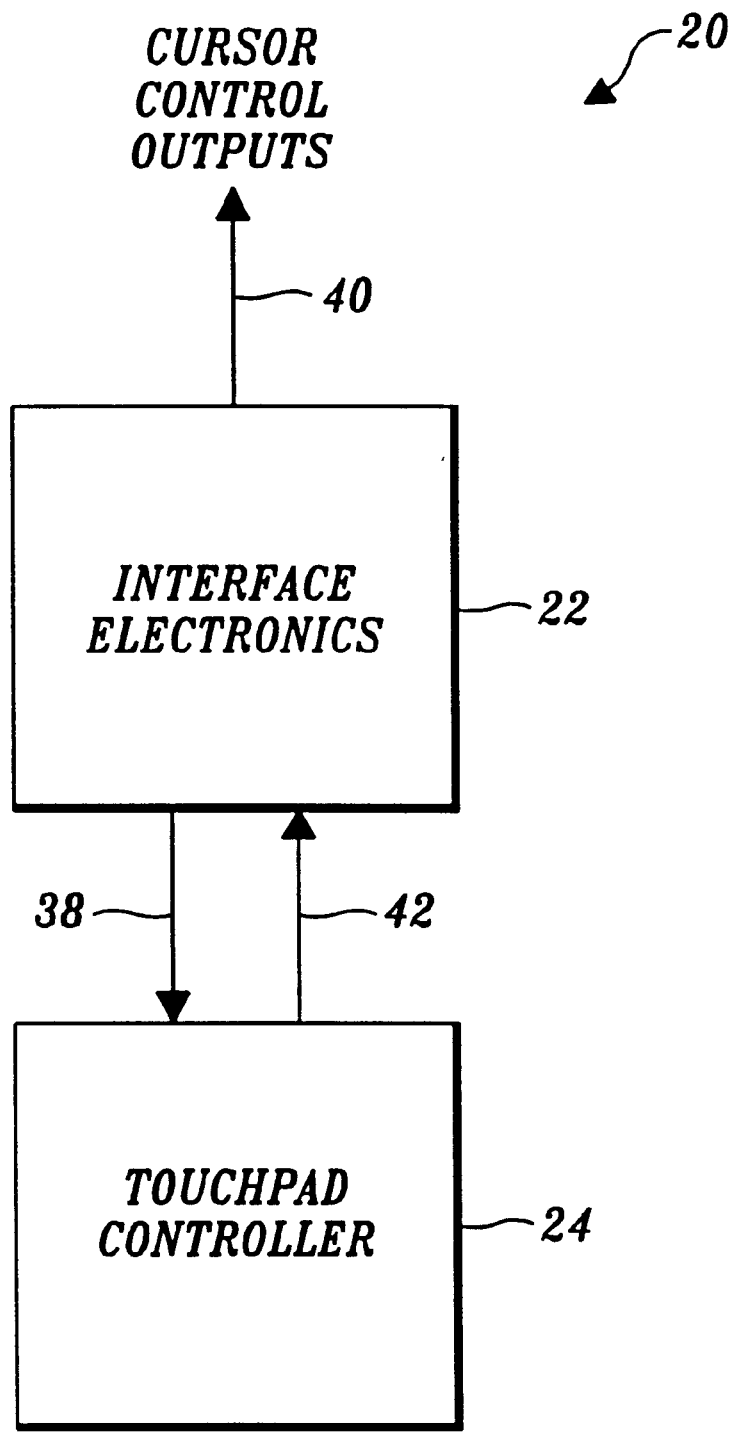
FIG. 1 is a block diagram of a cursor control device formed in accordance with the present invention.

FIG. 1 is a block diagram of a cursor control device 20 formed in accordance with the present invention. For ease of illustration and understanding, the cursor control device 20 has been functionally divided into two subsections: interface electronics 22 and a touch-pad controller 24.

Figure 2:
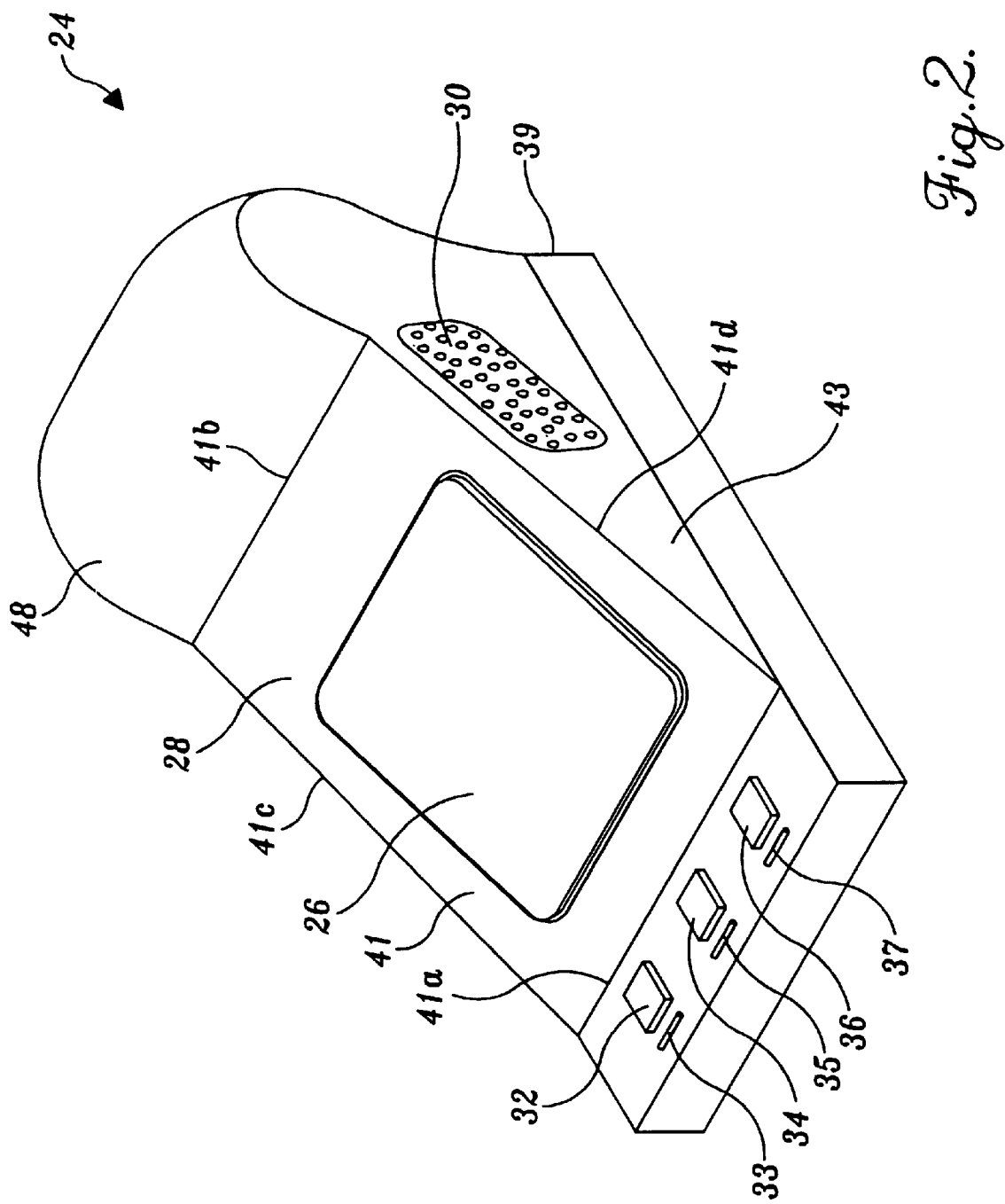
FIG. 2 is an isometric view of a touch-pad controller formed in accordance with the present invention, suitable for use in the cursor control device shown in FIG. 1.

An isometric view of a touch-pad controller 24 suitable for use in the cursor control device shown in FIG. 1, is illustrated in FIG. 2. The touch-pad controller 24 includes: a touch sensitive pad 26; a thumb switch 30; three display select switches 32, 34, and 36; and three annunciators 33, 35, and 37, all mounted in a housing 28.

Figure 3:
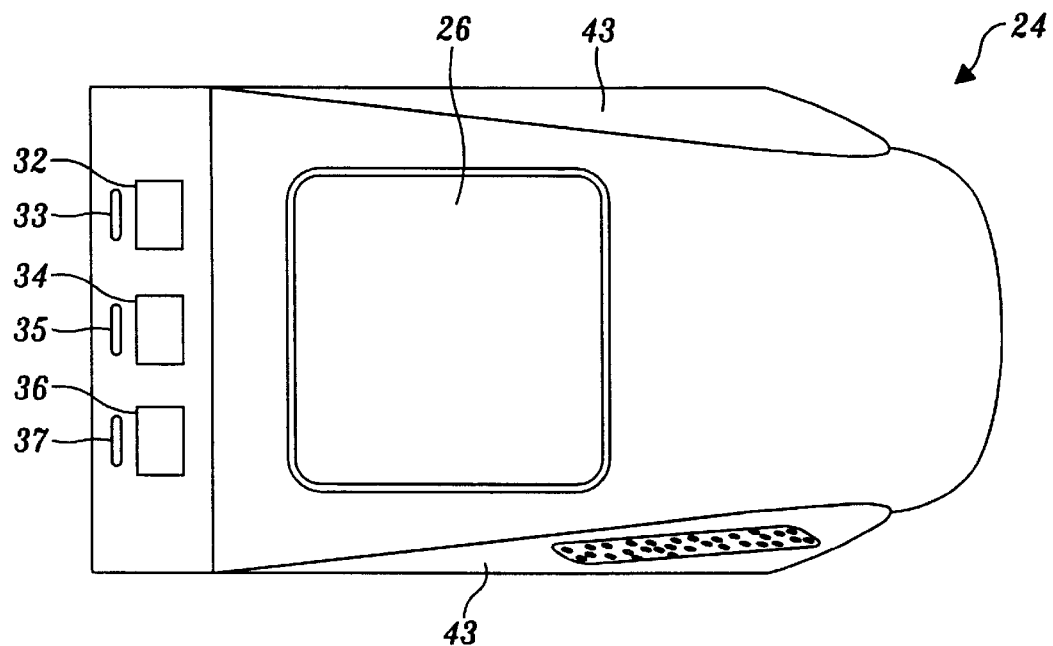
FIG. 3 is a top plan view of the touch-pad controller shown in FIG. 2.
Figure 4:
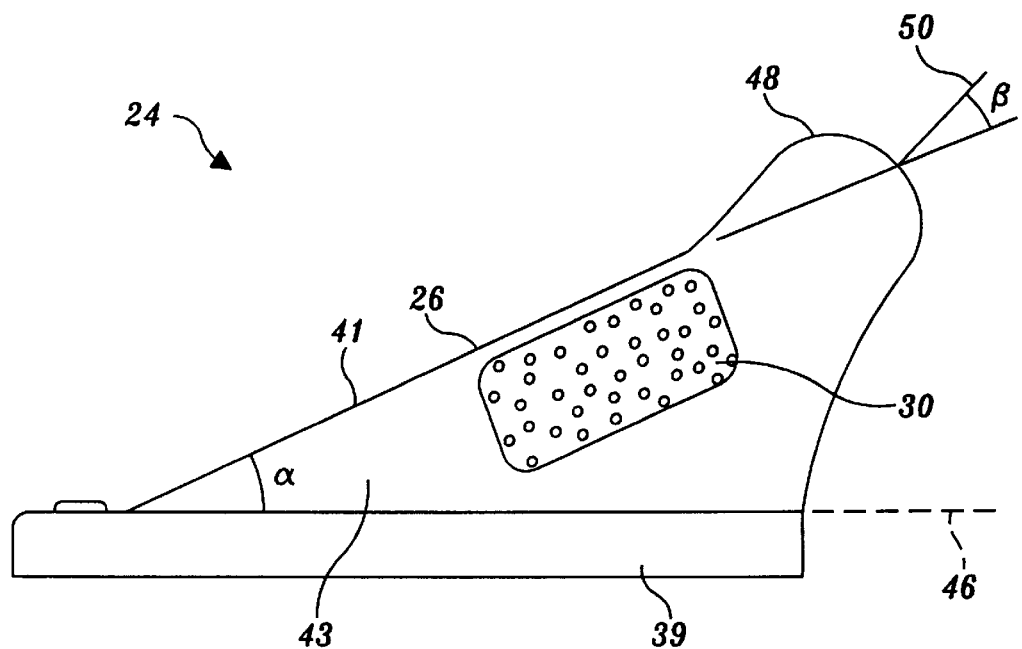
FIG. 4 is a side elevational view of the touch-pad controller shown in FIG. 2.

As illustrated in FIGS. 2–4, the housing 28 includes a right rectangular parallelepiped base 39. The housing also includes a planar, inclined trapezoidal surface 41 that slopes upwardly at an acute angle from the rectangular base 39. The parallel edges 41a and 41b of the inclined trapezoidal surface 41 lie generally parallel to the shorter edges of the rectangular base 39. The longer parallel edge 41a of the inclined trapezoidal surface 41 intersects the top surface of the rectangular base 39, and the shorter parallel edge 41b of the inclined trapezoidal surface 41 is disposed at the upper end of the inclined surface. The non-parallel edges 41c and 41d of the inclined trapezoidal surface 41 are of substantially equal length and are longer than the parallel edges 41a and 41b.

The side walls 43 of the housing 28, as best shown in FIGS. 2 and 3, are concavely contoured, sweep up from the longer edges of the rectangular base 39 and join the non-parallel edges 41c and 41d of the inclined trapezoidal surface 41. A palm support 48 slopes upwardly from the upper, shorter parallel edge of the inclined trapezoidal surface 41 of the housing 28, convexly curves through an arc of about 180°, and then concavely curves downwardly to form the rear of the housing 28. See FIG. 4 for a side elevational view of the palm support.

As seen in FIGS. 2 and 3, the touch sensitive pad 26 is substantially planar and approximately square in shape, with rounded corners, having sides that are preferably approximately 2.5 inches in length. The touch sensitive pad 26 is positioned in the housing 28 so that the plane of the touch sensitive surface of the touch sensitive pad 26 is generally parallel to the plane of the inclined trapezoidal surface 41. The touch sensitive pad 26 is oriented such that two of its edges are substantially parallel to the two parallel edges of the inclined trapezoidal surface 41 of the housing 28, and such that the touch sensitive pad is centrally located between the two non-parallel edges of the inclined trapezoidal surface 41. Finally, the edges of the touch-pad 26 are sealed to resist environmental damage, such as might result from coffee spills.

The display select switches 32, 34, and 36 are positioned on the upper surface of the rectangular base 39, between a shorter edge of the rectangular base 39, and the longer parallel edge 41a of the inclined trapezoidal surface 41 that intersects the upper surface of the rectangular base 39. The display select switches 32, 34, and 36 are aligned along a line that lies parallel to the shorter edges of the rectangular base 39. As the touch-pad 26 is viewed from behind the palm support 48, looking down the inclined trapezoidal surface 41 (which direction is defined as forward), the outer edges of two of the display select switches 32 and 36 are, respectively, approximately aligned with the right and left edges of the touch sensitive pad 26. The other display select switch 34 is mounted centrally between the two display select switches 32 and 36.

The three annunciators 33, 35, and 37 are positioned centrally forward and adjacent to the display select switches 32, 34, and 37 upon the upper surface of the rectangular base 39, such that one annunciator is aligned with each switch. The interface electronics 22 controls the annunciators 33, 35, and 37 to indicate the status of the display switches 32, 34, and 36, respectively. While the annunciators could take the form of incandescent light bulbs, preferably, the annunciators 33, 35, and 37 are light-emitting diodes that are lit by the interface electronics 22 when there is a cursor function on an associated computer display. Alternatively, the annunciators 33, 35, and 37 could be incorporated into their related select switch 32, 34, and 36, rather than being positioned adjacent their related switch. Still further, the annunciators 33, 35, and 37 could emit a different visible color to indicate the on/off status of their related select switch 32, 34, or 36.

The thumb switch 30, which is rectangular in shape, may be disposed in either of the two contoured side walls 43, depending upon whether the touch-pad controller 24 is intended for use by the left hand or the right hand of a user. If the touch-pad controller 24 is for use by the right hand of a user, the thumb switch 30 is positioned on the left contoured side wall 43 of the touch-pad controller 24, looking forward from the palm support 48. Thus, the touch-pad controller 24 shown in FIGS. 2 and 3 is for use by the right hand of a user. If the touch-pad controller 24 is for use by the left hand of a user, then thumb switch 30 is positioned on the right contoured side wall 43. In an alternate embodiment, the touch-pad controller 24 could have a thumb switch 30 on both the right and left side walls 43. Thus, in an alternate embodiment, the touch-pad controller 24 could be used with either the right or left hand of a user. As shown in FIGS. 2 through 5, the thumb switch is oriented in the contoured side wall 43 such that its longer sides lie substantially parallel to the plane of the inclined trapezoidal surface 41.

While the touch-pad controller 24 shown in FIGS. 2–4 was designed for use in the cockpit of an aircraft, it is to be understood that the touch-pad controller 24 can be used in other types of vehicles, and in applications not involving a vehicle. When used in a vehicle, the touch-pad controller 24 is preferably positioned such that the longitudinal axis of the rectangular base 39 lies generally parallel to the longitudinal axis of the vehicle, the touch-pad controller 24 being positioned slightly in front of a sitting user, at an elevation above the height of the user's legs in the sitting position, but below the user's elbow height. The rear of the palm support 48 is nearest the user, with the inclined trapezoidal surface 41 of the housing sloping downwardly away from the user, so that the forward portion of the touch-pad controller 24 is nearest the forward portion of the vehicle. A suitable location meeting these criteria would be on the console between the pilot and co-pilot of an aircraft or other vehicle.

A user rests his or her palm upon the palm support 48, with at least one finger (preferably the index or middle finger) of that hand resting upon the touch sensitive pad 26. The thumb of the hand rests upon the thumb switch 30. As noted above, the touch-pad controller 24 shown in FIGS. 2 and 3 is designed for use by the right hand of a user since the thumb switch is on the "thumb" side of a user whose right hand is positioned in the manner just described.

As shown in FIG. 4 the trapezoidal surface 41 of the housing forms an angle a with respect to the plane of the top of the base 39, represented by line 46. Preferably $\alpha$ has a nominal value of 25 degrees. The 25-degree value was determined by user evaluations as being the most comfortable for use when the touch-pad controller 24 is mounted in the position previously described. Since the touch-pad controller 24 is preferably positioned in a vehicle so that the longitudinal axis of the rectangular base 39 lies generally parallel to the longitudinal axis of the vehicle, the plane of the inclined trapezoidal surface 41 and, thus, the plane of the touch sensitive surface lies at an angle of approximately 25 degrees with respect to the longitudinal axis of the vehicle.

FIG. 4 also illustrates that the central axis of the palm support 48, represented by line 50, forms an angle $\beta$ with respect to the plane of the inclined trapezoidal surface 41 and, thus, the plane of the touch sensitive surface. Preferably, $\beta$ has a nominal value of 22.5 degrees. The 22.5-degree value was also determined by user evaluations as being the most comfortable for the palm support 48.

Figure 5:
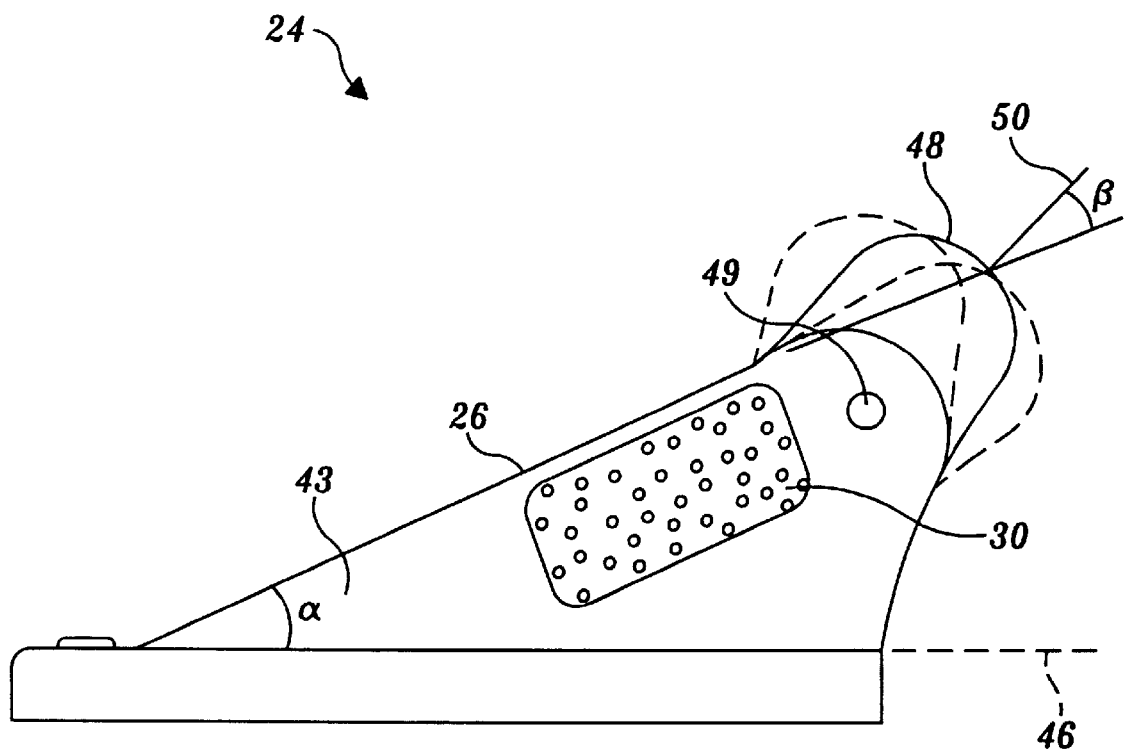
FIG. 5 is a side elevational view of an alternative embodiment of a touch-pad controller formed in accordance with the present invention.

While, preferably, the palm support 48 is fixed in position, as shown in FIG. 5, the palm support could be hingedly attached to the touch-pad controller, allowing $\theta$ to be adjusted to the angle preferred by a user. In the embodiment shown in FIG. 5, the palm support 48 is a separate component mounted to the housing with a pin 49. The pin 49 passes through the side wall 43 of the housing 28, in which the thumb switch 30 is mounted, through the palm support 48, and then through the opposite side wall 43 of the housing 28. As will be readily appreciated by those skilled in the art, the friction of this mounting must be sufficient to allow a user to rotate the palm support 48 about the central axis of the pin 49 until the $\beta$ angle chosen by the user is achieved and then hold the palm support at the chosen angle.

User evaluations generally determined the size, shape, and location of most of the components of the housing 28, and of the housing 28 itself. The determinations were made by using an iterative process of refining physical models and evaluation of the models by users with a wide range of hand sizes, to produce a design shown in FIGS. 2–4. The base 39 has a preferred nominal width of 3.6 inches, and a preferred nominal length of 5.75 inches. The maximum height of the touch-pad controller, measured perpendicularly from the bottom of the base 39 to the top of the palm support 48, is a preferred nominal dimension of 3.15 inches. The overall length of the touch-pad controller 24, measured along a line parallel to the longitudinal axis of the base 39, extending from a tangent line to the palm support 48 that is perpendicular to the upper surface of the base, to the forward part of the base, is a preferred nominal dimension of 6.56 inches. When used in an airplane, the dimensions of the touch-pad controller 24 and the contoured design provide for steady finger positioning during turbulence and easy hand positioning and relocation.

Based on anthropometric hand data of 5% female to 95% male pilots, the preferred nominal dimensions of the thumb switch 30 are 2.0 inches by 0.75 inches. As will be readily apparent to those skilled in the art, from these dimensions the thumb switch 30 is of a sufficiently large size relative to the touch-pad controller 24 such that when a user positions his or her right hand upon the touch-pad controller 24 he or she will easily contact the thumb switch 30 with the thumb of that hand without being required to adjust their hand position on the touch-pad controller 24. The same is also true for the left hand of a user, when using a touch-pad controller 24 configured with the thumb switch 30 on the opposite contoured side wall 43. As shown in FIGS. 2–5, preferably, the thumb switch 30 has a textured surface that provides tactile feedback that enhances this result, i.e., easy and reliable thumb contact. In a preferred embodiment the thumb switch 30 is textured with a plurality of dimples having a diameter of about 0.17 inches, and a maximum depth of about 0.04 inches.

In operation, when suitably energized, the touch sensitive pad 26 senses finger contact (or contact with another object) and controls the nature of the electrical signals 42 (FIG. 1) that are indicative of the location of the finger contact. The thumb switch 30 and the display select switches 32, 34, and 36 control the nature of the electrical signals that indicate the status of these switches. Since various ways of producing touch sensitive pads are well known in the art, no specific description of this technology is herein set forth. While the touch sensitive pad 26 incorporated in an actual embodiment of the invention produces electrical current variations in response to finger contact on the touch sensitive pad 26, it is to be understood that touch sensitive pads incorporating resistive, surface acoustic wave or other technologies can also be used.

Returning to FIG. 1, as will be readily appreciated by those skilled in the art, the interface electronics 22 include circuitry that produces signals 38 that scan the touch sensitive pad 26, the thumb switch 30 and the display select switches 32, 34, and 36 at regular intervals to determine if the status of these devices has changed. More specifically, the scanning determines if finger pressure has been applied to the touch sensitive pad and, if so, the location of the finger pressure; if the thumb switch 30 has been actuated; and if any of the select switches 32, 34, or 36 have been actuated. The signals 38 further control the state of the annunciators 33, 35 and 37. Return signals 42 from the touch-pad controller 24 contain information about finger pressure on the touch sensitive pad 26 and the state of the thumb switch 30 and the display select switches 32, 34, and 36. The interface electronics 22 analyze the return signals and produce cursor control output signals 40. Preferably, the interface electronics 22 include microcircuitry designed to carry out the foregoing functions under the control of a suitable program of the type shown in FIG. 6 and described next.

Figure 6:
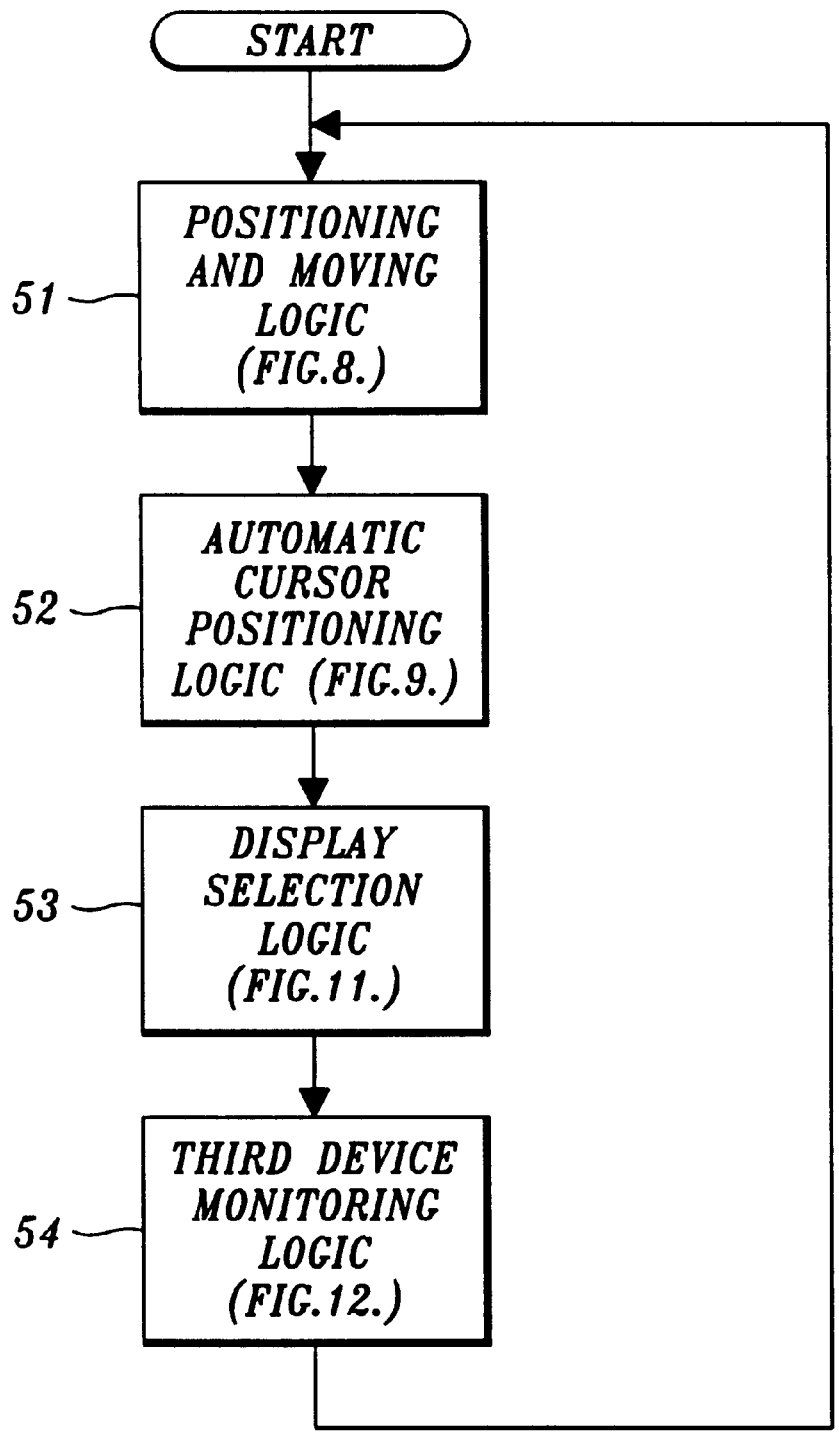
FIG. 6 is a flow chart of an interface program associated with the present invention, used for interfacing a touch-pad controller of the type shown in FIGS. 2–5 with one or more computer-controlled displays.

FIG. 6 is a program formed in accordance with the present invention suitable for controlling the interface electronics 22 that interface the touch-pad controller 24 with computer-controlled displays. The logic for carrying out each of the subroutines shown in FIG. 6 are illustrated and described in more detail below. Depending upon the actual use of the invention, some of the illustrated subroutines can be eliminated. The first step 51 of the FIG. 6 program is to execute cursor positioning and moving logic. This subroutine determines the position of a finger on the touch sensitive pad 26 and moves the cursor of an associated computer-controlled display in response to both finger contact and movement in both absolute and relative modes of operation as shown pictorially in FIG. 7 and described below. Suitable cursor positioning and moving logic is illustrated in detail in FIG. 8.

Figure 9:
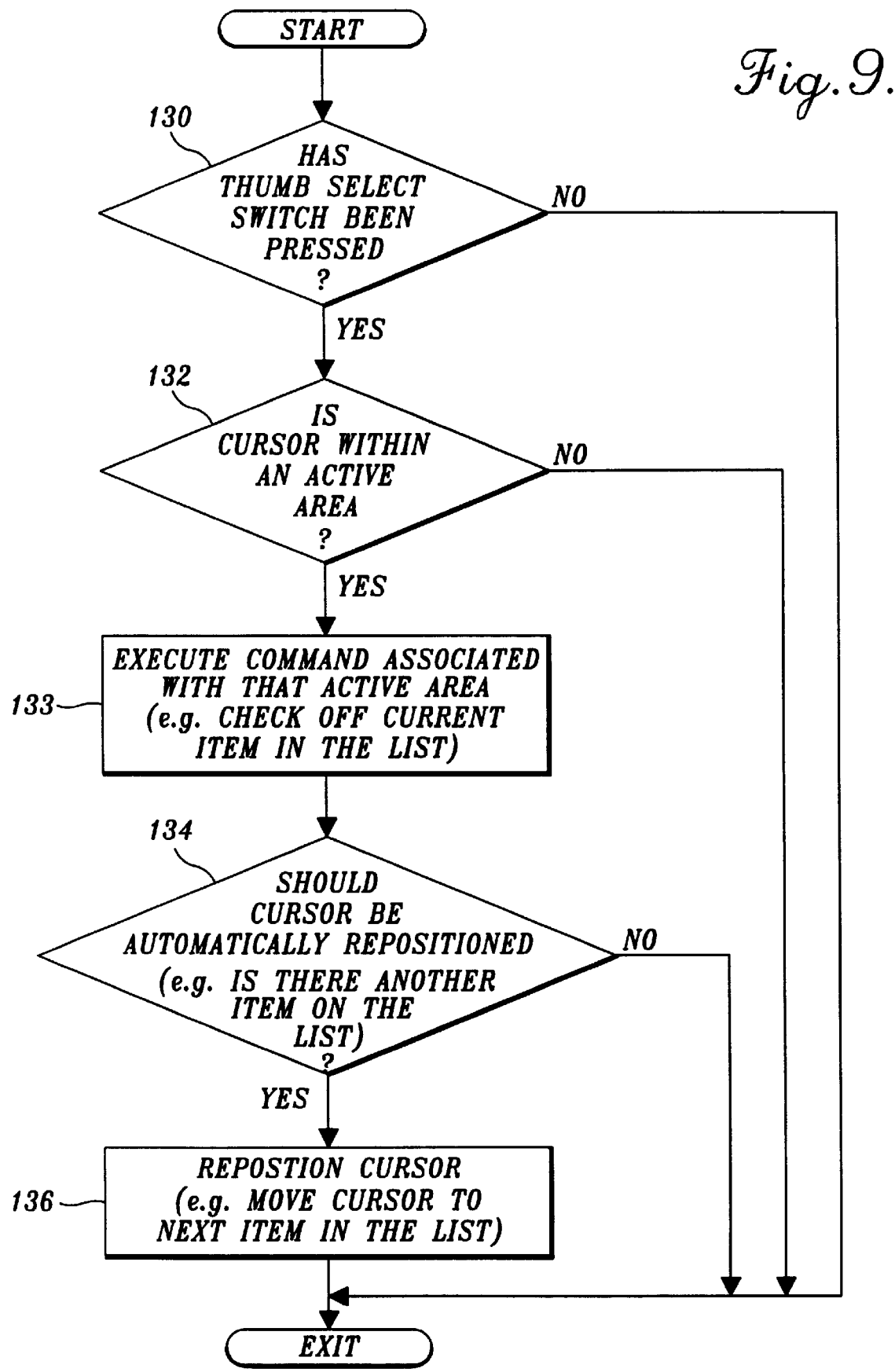
FIG. 9 is a flow chart showing automatic cursor positioning logic suitable for use in the interface program of FIG. 6.

The second step 52 is to execute logic that allows a cursor control device 20 to automatically reposition a cursor on a computer display. For example, this subroutine may allow the cursor control device to be used to check off items on a checklist in a rapid and easy manner. Suitable automatic cursor positioning logic is shown in FIG. 9 and described below.

Next, the FIG. 6 program proceeds to display selection logic 53. This subroutine permits the cursor control device 20 to select which display, from multiple displays, whose cursor position is to be controlled by the cursor control device.

Figure 11:
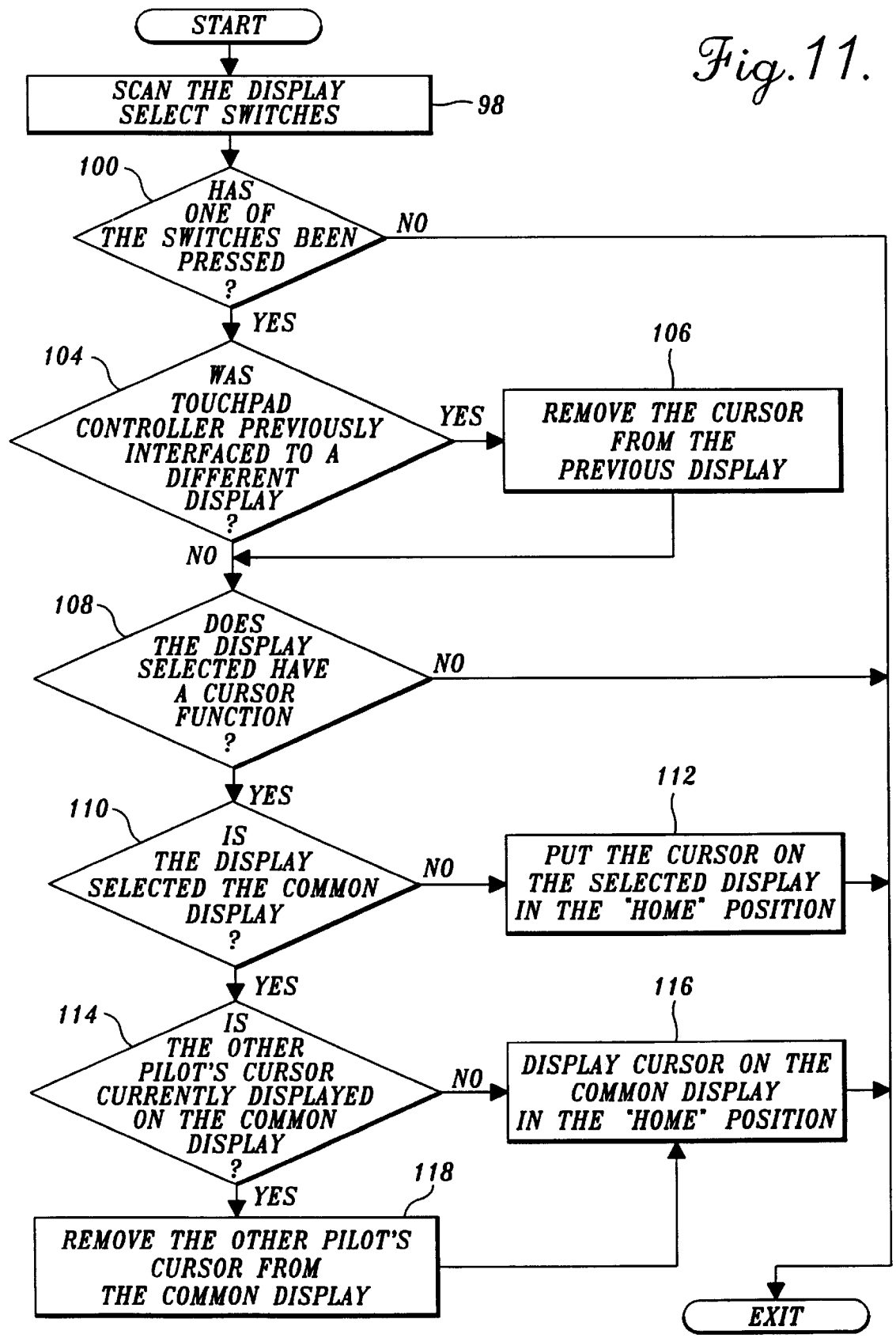
FIG. 11 is a flow chart showing display selection logic suitable for use in the interface program of FIG. 6.

Suitable display selection logic is shown in FIG. 11 and described below. Finally, the FIG. 6 interface electronics program proceeds to third device monitoring logic 54. This subroutine permits a third device to select which display the cursor control device is to interact with. Suitable third device monitoring logic is shown in FIG. 12 and described below.

Thereafter the first subroutine is repeated. The program remains in this loop until power shutdown or some idle command that does not form part of this invention occurs.

Before proceeding to a detailed description of each of the four subroutines depicted in FIG. 6, a description of how a cursor control device 20 formed in accordance with this invention is used in both relative and absolute modes is described. As noted above, most cursor control devices, such as a mouse or trackball, operate in a relative mode. The cursor is repositioned relative to its previous location on the display by an amount proportioned to the relative movement of the position of the mouse or trackball. In contrast, in an absolute mode the location of the cursor is a definite location on the computer-controlled display, not a location that is relative to a previous position. A touch screen is an example of a cursor control device that operates in an absolute mode.

Figure 7:
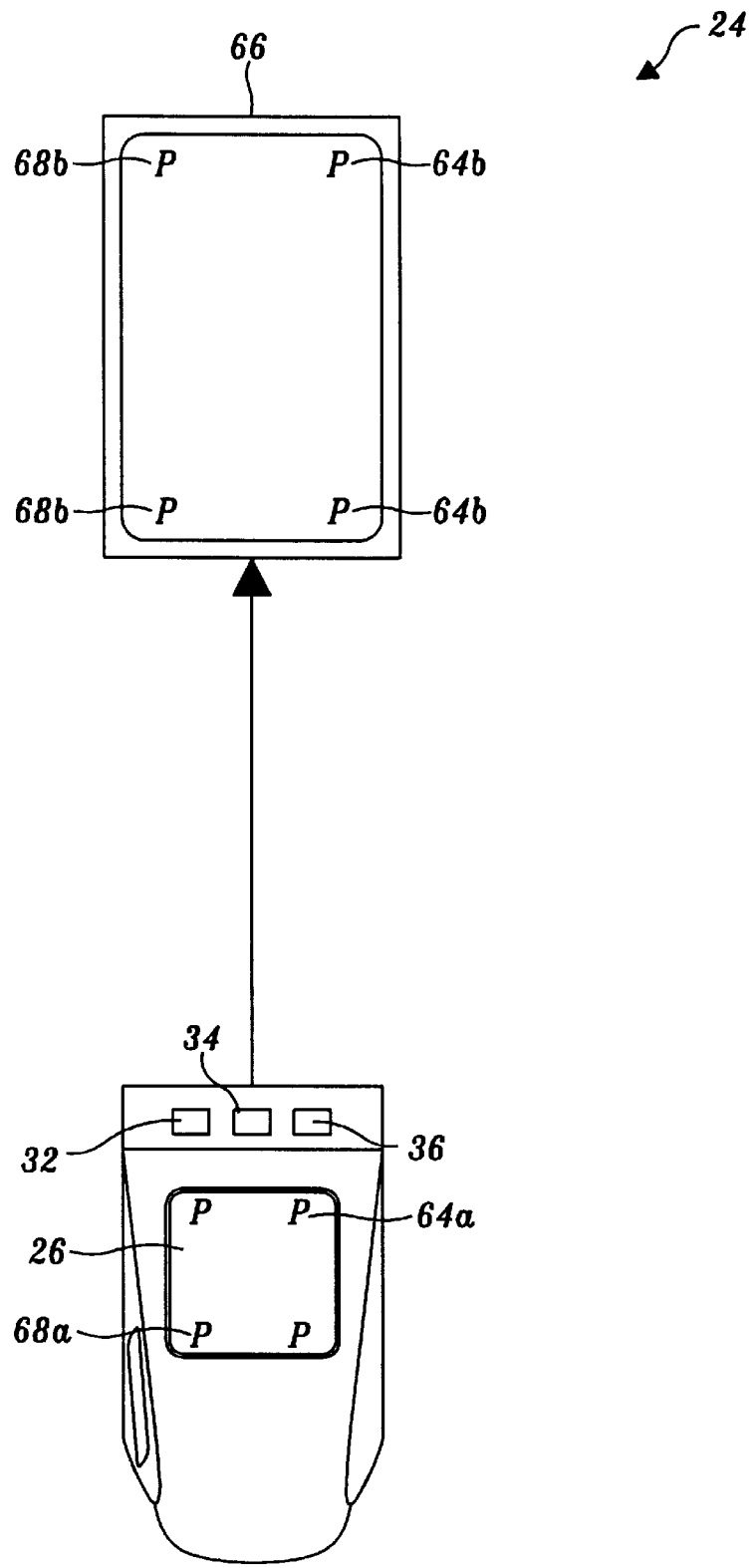
FIG. 7 is a schematic diagram illustrating the use of a cursor control device formed in accordance with the present invention, in "relative" and "absolute" cursor control modes.

FIG. 7 illustrates a cursor control device formed in accordance with this invention controlling the location of a cursor on a computer-controlled display 66 in both relative and absolute modes. For ease of understanding, the touch-pad controller 24 is shown as having a P in each corner of its touch sensitive pad 26. Likewise, for ease of understanding, the computer-controlled display 66 is shown as having a P at each corner. In the case of the computer-controlled display 66, the Ps represent absolute mode cursor locations. Also, for ease of illustration, neither the interface electronics associated with the touch-pad controller 24 or the details of the electronics associated with the computer-controlled display 66 are shown.

When a user first places his or her finger in the upper right corner of touch sensitive pad 26 at location P identified by reference numeral 64*a*, the positioning and moving logic (block 51) of FIG. 6 places the cursor of display 66 in the upper right corner at location P identified by reference numeral 64*b*. Similarly, if the user first places his or her finger in the lower left corner of touch sensitive pad 26 at location P identified by reference numeral 68*a*, the positioning and moving logic of FIG. 6 places the cursor in the lower left corner of display 66 at location P identified as reference numeral 68*b*. The same relative result occurs when the user places his or her finger in the other two corners of the touch sensitive pad 26. Other positions on the touch sensitive pad 26 do not create the same result, only the corner positions. Thus, users can quickly position a cursor in a far corner of a computer-controlled display without being required to drag a finger across the touch sensitive pad 26. As a matter of fact, dragging a finger to a corner does not activate the just-described absolute mode of operation. This mode of operation is activated only if the user first places his or her finger in one of the corner locations.

The foregoing cursor movement mode is absolute because a specific location on the touch sensitive pad 26, namely the corners, corresponds to a specific location on the computer-controlled display 66. The foregoing assumes, however, that a user first places his or her finger at the P location 64a or 68a, and does not drag his or her finger to those locations across the touch sensitive pad 26. When a user drags his or her finger to any location from a previous location, including a P location, the positioning and moving logic of FIG. 6 moves the cursor in relative mode. That is, the positioning and moving logic determines the location to display the cursor, relative to the cursor's previous location, based on the present finger location of the user's finger, relative to its previous location.

Figure 8:
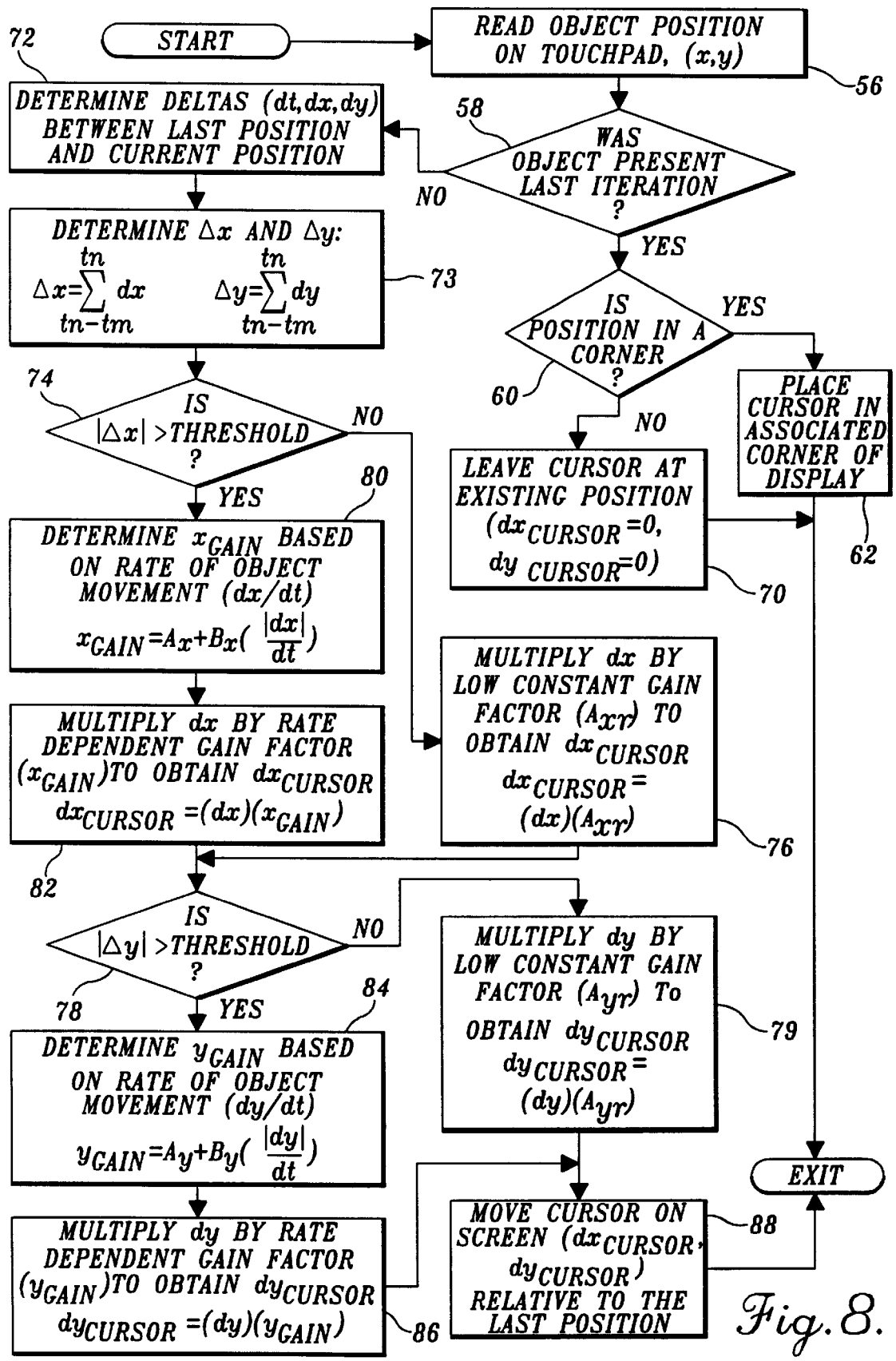
FIG. 8 is a flow chart showing positioning and moving logic suitable for use in the interface program of FIG. 6.

FIG. 8 is a flow chart showing positioning and moving logic formed in accordance with the present invention suitable for use in the interface electronics program shown in FIG. 6. Part of the logic shown in FIG. 8 is directed to minimizing erroneous cursor control commands generated by the inadvertent finger movement resulting from acceleration forces created by aircraft movement due to turbulence. The same FIG. 8 logic also minimizes erroneous cursor control commands due to nervousness, other causes of unintended contact, or repositioning of a user's fingers upon the touch sensitive pad 26. Another part of the FIG. 8 logic is directed to allowing the touch-pad controller 24 to be used in both relative and absolute modes, in the manner previously described in connection with FIG. 7.

The advantageous feature of minimizing erroneous cursor control commands is accomplished by incorporating a variable gain law in the interface logic. In accordance with the variable gain control law, which is described in detail below, when a user moves his or her finger (or some other pointed object, such as a stylus) within a small area on the touch sensitive pad, a low constant gain is applied to the resulting touch-pad output signal. A variable gain is applied when a user moves his or her finger across a relatively large area on the touch sensitive pad 26. High gain occurs when finger movement over the relatively large area is fast. High gain increases the likelihood that the cursor can be commanded to reach any part of a display without a user having to lift and reposition his or her hand from the touch sensitive pad 26 before the desired cursor position is reached, as would be the case if a low gain value were used.

The first step of the FIG. 8 logic is to read the finger position (or other object) on the touch sensitive pad in XY Cartesian coordinates. See block 56. (If no finger is present, the entire sequence of steps is bypassed.) At decision block 58 a test is made to determine if the user's finger was present during the last iteration. If the finger was not present during the last iteration, a test is made (decision block 60) to determine if the finger is located in a corner of the touch sensitive pad 26. If so, the cursor is placed in the corner of the display associated with that corner of the touch sensitive pad 26, as described above in connection with FIG. 7. See block 62. (For simplicity of illustration, the steps involved in determining the corner corresponding to the position of the finger are not illustrated.) Thereafter, the program exits the FIG. 8 logic.

If the finger was just put down on the touch sensitive pad 26 but not in a corner position so that the inquiry at decision block 60 is negative, the cursor delta movement values ($dx_{CURSOR}$, $dy_{CURSOR}$) are set to zero, which leaves the cursor at its existing position (block 70), and the program exits the FIG. 8 logic. Thus, inadvertent touching of the touch sensitive pad 26 does not cause cursor movement.

If the finger was present during the last iteration (block 58), dt, dx, and dy delta (change) values are determined in block 72. dt is the time between the last iteration and the current time. dx and dy are the difference between the last position of the finger and the current position of the finger in X and Y directions, respectively.

Referring to FIG. 3, as used in this description, the X direction of a touch-pad controller 24 is the direction along a line lying generally parallel to the line along which the select switches 32, 34 and 36 lie. The Y direction is the direction perpendicular to the X direction. On an associated computer display, the X direction is the lateral, or horizontal direction and the Y direction is the vertical direction.

Returning to FIG. 8, at block 73 $\Delta x$ and $\Delta y$ values are determined as follows. First, a summation for dx is made over a predefined time interval, $\Delta t$. While various values can be used, preferably, $\Delta t$ is 0.6 seconds and the logic of FIG. 8 is executed every 0.025 seconds, i.e., a new value of dx (and dy) is determined every 0.025 seconds. Since the dx summation is for a time 0.6 seconds ($\Delta t$) before the present time, the number of dx values summed is 24 (0.6÷0.025= 24). In block 73, $t_n$ represents the present time, or the present iteration, while $t_m$ represents a previous time during a previous iteration, such that $t_m$ subtracted from $t_n$ is equal to $\Delta t$, i.e., $t_m$ precedes $t_n$ by 0.6 seconds. After the summation for $\Delta x$ has been made, the same summation is made for $\Delta y$.

Then, a test is made at block 74 to determine if the absolute value of $\Delta x$ is greater then a predefined threshold value, such as 0.25 inches, for example. If $\Delta x$ is not greater than the predefined threshold value, dx (not $\Delta x$) is multiplied by a low constant gain factor ($A_{xr}$) to obtain the X direction movement value to be applied to the display cursor ($dx_{CURSOR}$). See block 76. While the value of $A_{xr}$ can vary, in one actual embodiment of the invention, it was set at 1.10. Thus, $dx_{CURSOR}$ is equal to the dx movement of the finger multiplied by a constant gain value ($A_{xr}$).

After $dx_{CURSOR}$ is determined for the situation where the absolute value of $\Delta x$ is not greater than the threshold value, a test is made to determine if the absolute value of $\Delta y$ is greater than a predefined threshold value. See block 78. Preferably, the predefined threshold value is again 0.25 inches. If the absolute value of $\Delta y$ is not greater than the predefined threshold value, dy (not $\Delta y$) is multiplied by the low constant gain factor ($A_{yr}$) to obtain $dy_{CURSOR}$. See block 79. While $A_{yr}$ could be different than $A_{xr}$, preferably $A_{yr}$ and $A_{xr}$ are the same—1.10, for example. Thus, $dy_{CURSOR}$ is equal to the dy movement of the finger multiplied by a constant gain value ($A_{yr}$).

While the presently preferred predefined threshold values for the absolute values of dx and dy are both 0.25, and for $A_{xr}$ and $A_{yr}$ are both 1.10, as noted above, other values, including unequal values, can be chosen, if desired.

Returning to FIG. 8, if the absolute value of $\Delta x$ is greater than the predefined threshold value, an $x_{GAIN}$ value based on the rate of finger movement in the X direction is determined. See block 80. Specifically, the rate of finger movement in the X direction is approximated by dividing the absolute value of dx, i.e., $|dx|$, by dt. The value of $x_{GAIN}$ is then determined from the equation:

$$x_{GAIN} = A_x + B_x \left[ \frac{|dx|}{dt} \right] \qquad (1)$$

where $\Delta x$ is equal to 1.80, and $B_x$ is equal to 0.16. Next, dx is multiplied by $x_{GAIN}$ to obtain $dx_{CURSOR}$ (block 82). Thus, $dx_{CURSOR}$ is the finger movement distance along the X axis (dx) multiplied by the X-axis rate-dependent gain factor ($x_{GAIN}$).

Following block 82 the logic reaches decision block 78. As previously described, a test is made at decision block 78 that determines if the absolute value of Δx is greater than a predefined threshold value. If the answer to the test is negative, the steps set forth in block 79 are executed in the manner previously described.

If the absolute value of Δy is greater than the predefined threshold value, a $y_{GAIN}$ value based upon rate of finger movement in the Y direction is determined. See block 84. The value of $y_{GAIN}$ is determined in accordance with the equation:

$$y_{GAIN} = A_y + B_y \left[ \frac{|dy|}{dt} \right] \quad (2)$$

where $A_y$ is equal to 1.80, and $B_y$ is equal to 0.23. Next (block 86) dy is multiplied by $y_{GAIN}$ to obtain $dy_{CURSOR}$. Thus, $dy_{CURSOR}$ is equal to the finger movement distance along the Y axis (dy) multiplied by the Y axis rate-dependent gain factor ($y_{GAIN}$).

Next, the logic executes block 88, which is the generation of a command to move the cursor on the computer screen by $dx_{CURSOR}$ and $dy_{CURSOR}$ relative to the last position of the cursor on the display screen. Block 88 is also executed following block 79. Thus, the cursor can be repositioned along the X and Y axes of the display in a rate-dependent or constant manner. That is, movement along both axes can be constant or rate-dependent, or movement along one axis can be rate-dependent and the other constant. Following block 88, the program exits the logic shown in FIG. 8.

The purpose of applying a low constant gain to obtain $dx_{CURSOR}$ and $dy_{CURSOR}$, if the absolute value of the finger along the X and Y axes of the touch-pad controller 24 is not greater than a predefined threshold value over a certain period, is based on the assumption that the user does not wish to substantially reposition the cursor in such a situation. Alternatively stated, if the finger has only been repositioned within a small distance of its former position, it is likely the user only wishes to reposition the cursor a relatively small distance. Because low gain is used, greater finger movement is necessary to create a fixed amount of cursor movement than would be the case if a higher gain value were used. This results in more precise control over cursor location. Moreover, very small inadvertent finger movement upon the touch sensitive pad 26, such as might be created by the effect of air turbulence on an aircraft pilot, is essentially ignored because the location of the cursor on the display will only be changed by a relatively small amount.

In contrast, if the minimum threshold value is exceeded, a higher, rate-dependent gain is applied, based on the assumption that the user wishes to substantially reposition the cursor on the screen, preferably without encountering a boundary of the touch sensitive pad 26 of the touch-pad 24. To elaborate, as with constant low gain, a rate-dependent gain is applied only when the touch-pad controller 24 is in a relative mode of operation. In the relative mode, the cursor on the screen is to be repositioned proportionally to the distance that the user moves his or her finger across the touch sensitive pad 26.

Depending upon the gain factors that associate finger movement distance along the X and Y touch sensitive pad axes (dx, dy) with cursor movement along the X and Y display axes ($dx_{CURSOR}$, $dy_{CURSOR}$), it is possible for a user to encounter a touch sensitive pad boundary before the cursor is relocated to the desired screen position. When this occurs, the user must lift his or her finger off of the touch sensitive pad 26, reposition his or her finger on the interior of the touch sensitive pad 26, and continue dragging his or her finger across the touch sensitive pad 26 in the necessary direction until the cursor reaches the desired position.

When a high gain is used during the foregoing activity, less finger movement distance is required to achieve a specific cursor movement distance than would be the case with a lower gain. Thus, higher gain makes it less likely that a user will encounter a touch sensitive pad boundary before the desired cursor position is reached. Because rate-dependent gains are a function of the rate of finger movement, a user has some control over his or her ability to avoid encountering a touch sensitive pad boundary.

As noted above, preferably the value of $B_y$ is greater than $B_x$. Specifically, $B_y$ is equal to 0.23, while $B_x$ is equal to 0.16. This results in a greater $y_{GAIN}$ than an $x_{GAIN}$ for an equal rate of finger movement in the Y direction as in the X direction. The reason for the foregoing is that for most users, it is easier to move their finger laterally, in the X direction, rather than longitudinally in the Y direction. Thus, the greater $y_{GAIN}$ enables most users to approximately be able to equally command vertical cursor movement, as lateral cursor movement with the touch-pad controller 24.

If a user simply wishes to reposition the cursor in a corner of the computer display screen, the user can lift his or her finger off of the touch sensitive pad 26 and place it in the corner of the touch sensitive pad 26 associated with the corner of the computer display. For example, as previously described in FIG. 7, if the user places his or her finger in the upper right corner of touch-pad controller 24 at location P identified by reference 64a, the cursor will be repositioned in the upper right-hand corner at location P identified as reference numeral 64b in computer display screen 66. Thus, using the touch-pad controller 24 in absolute mode enables the user to quickly position the cursor at a desired location of a number of predetermined locations.

FIG. 9 is an automatic cursor positioning logic diagram suitable for use in the interface electronics program illustrated in FIG. 6. As noted above, one application of the automatic cursor positioning logic could be to allow the thumb switch 30 to be used to reposition the cursor item-by-item adjacent the items on an electronic checklist. This feature is advantageous to airplane pilots, since airplane pilots frequently go through checklists, such as preflight checklists.

The logic shown in FIG. 9 begins by checking the state of the thumb switch to determine if the thumb switch 30 of the touch-pad controller 24 has been pressed. See decision block 130. If the thumb switch 30 has not been pressed, the program exits the logic shown in FIG. 9.

If the thumb switch 30 has been pressed, the logic proceeds to decision block 132 whereat a test is made to determine if the cursor is within an active area of the display on the computer-controlled display interface to the touch-pad controller 24. If the cursor is not within an active area of the display, the program once again exits the logic shown in FIG. 9. Otherwise, at block 133, the command associated with that active area is executed. For example, if the display is an electronic checklist, the active area is a check off area adjacent to the current item in the list and the command is to create a check (✓) in the active area. Thereafter, at decision block 134, a test is made to determine whether there is a location to which the cursor should automatically be repositioned. For example, if an electronic checklist were being displayed, the cursor should be automatically repositioned to the active area adjacent to the next item on the list. If not, the program exits the logic shown in FIG. 9. If so, the cursor is repositioned to the foregoing location. See block 136. Thereafter the program exits the logic shown in FIG. 9.

Figure 10:
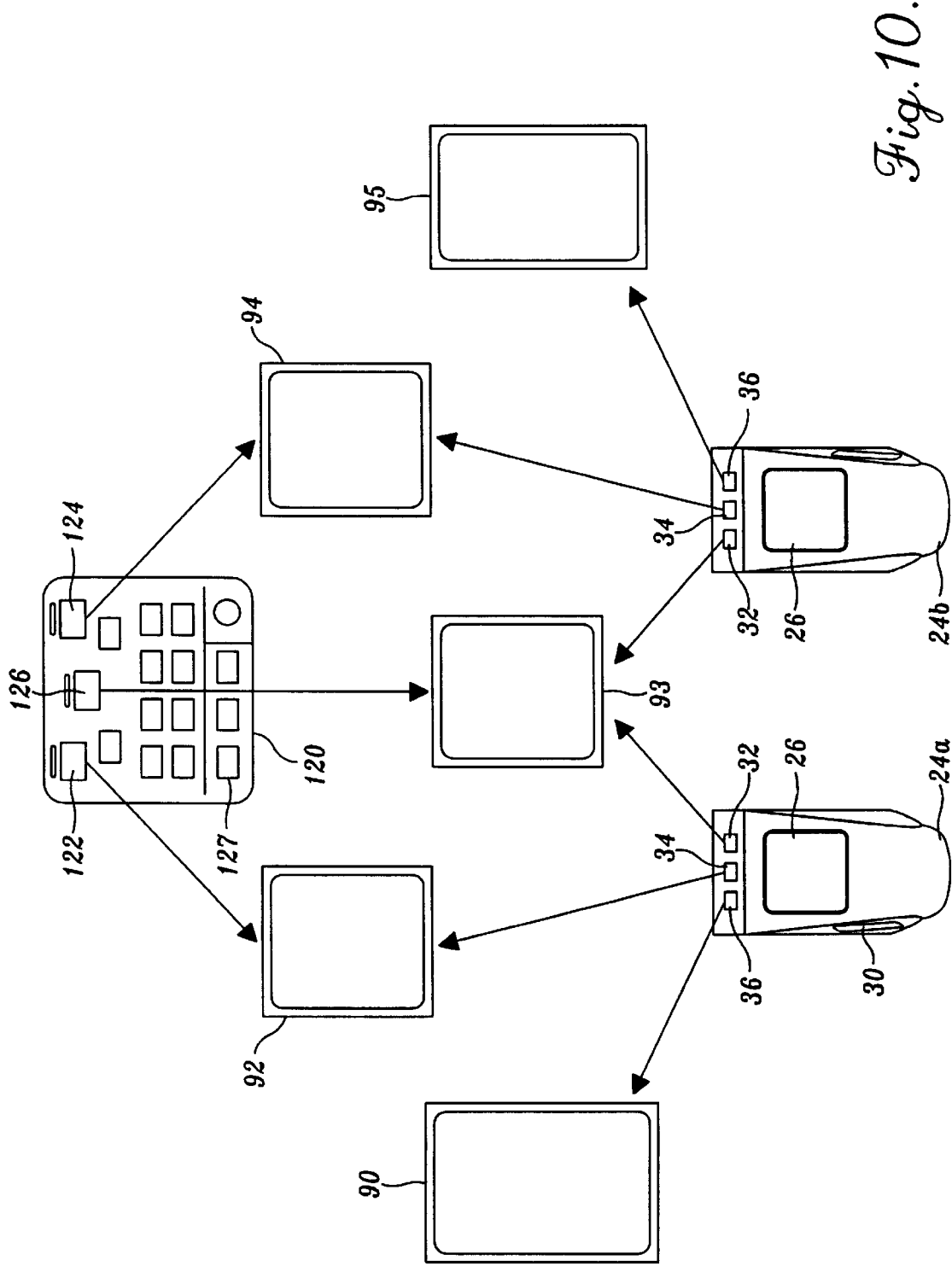
FIG. 10 is a schematic diagram of a pair of cursor control devices that include touch-pad controllers of the types shown in FIGS. 2–5, used to control the cursors of multiple displays.

As described next and shown in FIGS. 10 and 11, cursor controlled devices formed in accordance with this invention can be used to control cursors on multiple displays. Or, multiple cursor control devices can be used to control the cursor of the same display. This feature makes the cursor control device ideally suited for use in the cockpit of an airplane by the pilot and co-pilot if one or more displays is being shared. More specifically, FIG. 10 illustrates a first touch-pad controller 24a coupled to three computer-controlled displays 90, 92, and 93. For ease of illustration, neither the interface electronics associated with the touch-pad controller or the details of the electronics associated with the computer-controlled displays are illustrated.

When a user depresses one of the select switches 36, the touch-pad controller 24a is interfaced to one of the computer-controlled displays 90. Similarly, when the other select switches 34 or 32 are depressed, the touch-pad controller 24a is interfaced to one of the other computer-controlled displays 92 or 93, respective only one interface occurs at a time. Thus, when the touch-pad controller 24a is interfaced with one computer-controlled display, the user's actions only control the cursor of that display, not the cursor of the other displays.

FIG. 10 also includes a second touch-pad controller 24b coupled to three computer-controlled displays 93, 94, and 95. Again, for ease of the illustration, the electronics associated with the touch-pad controller and the displays are not shown. When one of the select switches 36, 34, or 32 on the second touch-pad controller 24b is depressed, the touch-pad controller 24b is interfaced with an associated one of the computer-controlled displays 95, 94, or 93, respectively. As shown, one of the computer-controlled displays 93 can be interfaced with either the first or the second touch-pad controller 24a or 24b. In an aircraft, one of the touch-pad controllers 24a would be positioned for use by the pilot and the other positioned for use by the co-pilot. Thus, both the pilot and the co-pilot could use a touch-pad controller to control the position of the cursor of the common computer-controlled display 93.

While both touch-pad controllers 24a and 24b may be used to control the cursor of the common computer-controlled display 93 shown in FIG. 10, the touch-pad controllers 24a and 24b cannot be used to simultaneously control the location of the cursor on computer display 93. Alternatively stated, the pilot may select touch-pad controller 24a to control computer display 93 by depressing select switch 32 on touch-pad controller 24a, or the co-pilot may select touch-pad controller 24b to control the cursor location on computer display 93 by depressing select switch 32 on touch-pad controller 24b, but touch-pad controllers 24a and 24b may not simultaneously control cursor location on the common computer-controlled display 93. Preferably, different cursor symbols are displayed when the pilot is controlling the location of the cursor on the common computer-controlled display 93, and when the co-pilot is controlling the cursor location. As described below, the interface logic removes the pilot'cursor from the common display when the co-pilot's controller 24b is interfaced with the common display, and vice versa.

Display selection logic suitable for use in the interface electronic program (FIG. 6) for interfacing either one of the touch-pad controllers 24a and 24b with a plurality of computer-controlled displays such that the select switches 32, 34, and 36 of a touch-pad controller 24a or 24b can be used to select a computer-controlled display for controlling the cursor location thereon in the manner previously described is shown in FIG. 11. The logic also shows how two touch-pad controllers are interfaced with a common computer-controlled display.

First, the display select switches 32, 34, and 36 are scanned (block 98) to determine their state. Next, at decision block 100, a test is made to determine if one of the switches 32, 34, and 36 on the associated touch-pad controller 24a or 24b has been depressed since the last pass through this subroutine. In this regard, it should be noted that the select switches are interrelated in that only one switch can be depressed (engaged) at a time. When one switch is depressed, any previously depressed switch is disengaged.

If none of the switches 32, 34, and 36 has been depressed, the program exits the logic shown in FIG. 11. If a switch 32, 34, or 36 has been depressed, at decision block 104 a test is made to determine if the associated touch-pad controller 24a or 24b was previously interfaced to a different display. If the answer is yes, then the cursor is removed from the previous display (block 106). After block 106, or if the answer was negative, the logic proceeds to decision block 108. At decision block 108, a test is made to determine if the selected display has a cursor function. If the display does not have a cursor function, the program exits the logic shown in FIG. 11. Otherwise, the program proceeds to decision block 110, where a test is made to determine if the display selected is the common computer-controlled display 93 (FIG. 10).

If the inquiry at decision block 110 in FIG. 11 is negative, that is, if the display selected is not the common computer-controlled display 93, the cursor is displayed on the selected display in the "home" position (block 112). That is, the cursor is displayed at a default location on the selected display. Thereafter, the program exits the logic shown in FIG. 11.

If the selected display is the common computer-controlled display 93 in FIG. 10, at decision block 114, a test is made to determine if the other pilot's cursor is currently displayed on the common computer-controlled display 93. In other words, at decision block 114 a determination about whether the other touch-pad controller 24 is currently being used to control cursor location on the common computer-controlled display 93 is made. If that determination is negative, the cursor associated with the controlling touch-pad controller 24a or 24b is displayed on the common computer-controlled display 93, at the home position. See block 116. Then the program exits the logic shown in FIG. 11.

If the cursor associated with the other pilot's touch-pad controller is being displayed on the common display, the other cursor is removed from the display 93. See block 118. Next, the program proceeds to block 116 and the cursor associated with the controlling touch-pad controller is displayed on the common computer-controlled display 93 in the home position. Then the program exits the logic shown in FIG. 11.

As also illustrated in FIG. 10, a third device 120 may be used to determine with which computer-controlled display a touch-pad controller 24 is going to be interfaced. The third device 120, shown in FIG. 10, includes three display select switches 122, 124, and 126. If a user depresses the first display select switch 122, and then a function switch to execute a program that requires a cursor, such as switch 127 (which in a preferred embodiment of the present invention is associated with an electronic checklist program), one of the touch-pad controllers 24a is interfaced to a first computer-controlled display 92. Alternatively, if a second display select switch 124 is depressed, and then a function switch to execute a cursor-requiring program, the other touch-pad controller 24b is interfaced to a second computer-controlled display 94. Finally, if the third display select switch 126 is depressed, and then a function switch to execute a cursor-requiring program, then either touch-pad controller 24a or touch-pad controller 24b is interfaced to the common computer-controlled display 93, as explained below.

The third device monitoring logic suitable for use in the interface electronics program shown in FIG. 6 for carrying out the foregoing functions is shown in FIG. 12. The first step of the logic is to scan the display select switches 122, 124, and 126 of the third device 120 (FIG. 10) to determine if one of the switches has been depressed. Next, at decision block 138, a test is made to determine if a program has been selected that requires a cursor function. That is, a determination is made as to whether a function switch has been depressed to execute a program requiring a cursor. If a cursor is not required by the program associated with the depressed function switch, the program represented in FIG. 12 exits the logic shown. If a cursor is not required by the program associated with the depressed function switch, there is no cursor for the touch-pad controller 24a or 24b to control on the selected display. Otherwise, the logic proceeds to decision block 142.

At decision block 142, a test is made to determine if the display selected is the common computer-controlled display 93 in FIG. 10. If the determination is affirmative, the logic proceeds to decision block 144, where a test is made to determine if the most recent access of the common computer-controlled display 93 was by the co-pilot. If the determination is negative, the pilot's cursor is placed on the common computer-controlled display 93 in the home position. See block 146. Referring to FIG. 10, since the pilot sits in the left seat of an airplane, when this path is followed, touch-pad controller 24a is interfaced to the common computer-controlled display 93 in FIG. 10. After block 146 has been executed, the program exits the logic shown in FIG. 12.

In summary, the logic shown in FIG. 12 and thus far described automatically determines which touch-pad controller 24a or 24b will control cursor location on the common computer-controlled display 93 based on which touch-pad controller 24a or 24b was last interfaced to the common computer-controlled display.

Returning to decision block 144, if the determination is in the affirmative, the co-pilot's cursor is displayed on the common computer-controlled display 93 in the home position. Since the co-pilot of a plane sits on the right, when this path is followed touch-pad controller 24b is interfaced with the common computer-controlled display 93. After block 148, the program exits the logic shown in FIG. 12.

Returning to decision block 142, if the display selected is not the common computer-controlled display 93, the logic proceeds to decision block 150. At decision block 150 a test is made to determine if the left inboard computer-controlled display 92 of the airplane (viewed looking forward along the longitudinal axis of the aircraft) was selected as a result of the first display select switch 122 of the third device 120 (FIG. 10) having been depressed. If this determination is negative, which means that the second display select switch 124 was depressed, the co-pilot's cursor is placed on the right inboard computer-controlled display 94 in the home position. See block 152. Since, as noted above, the co-pilot normally uses the right touch-pad controller, when this path is followed, touch-pad controller 24b is interfaced with the right inboard computer-controlled display 94 (FIG. 10).

If, on the other hand, the left inboard computer-controlled display 92 was selected as a result of the first display select switch 122 having been depressed, block 154 is executed. At block 154 the pilot's cursor is placed on the left inboard display 92 in the home position. Since the pilot uses the left touch-pad controller, when this path is followed, touch-pad controller 24a is interfaced to the left inboard computer-controlled display 92 (FIG. 10). After block 152 or 154, the program exits the logic shown in FIG. 12.

As shown in FIG. 6, the logic represented in FIGS. 8, 9, 11, and 12 is repeatedly executed, so long as a cursor control device 20 is being used to control the location of a cursor on a computer-controlled display. As will be readily apparent to those skilled in the art, as noted above, one or more of the logic subroutines shown in FIGS. 9, 11, and 12 may be deleted from FIG. 6 if the features associated with the logic are not necessary or desired in an actual embodiment of the invention. For example, if interaction with an electronic checklist is unnecessary or undesired, the FIG. 9 logic will be deleted. Or, if a cursor control device 20 is only being used with one computer-controlled display, the FIG. 11 and 12 logic will be deleted. In this case, there is no need to select a display since only one display exists.

Positioning and moving logic (FIG. 8) will always be included, since this logic will always be necessary to interface a touch-pad controller to a computer-controlled display to use a cursor control device 20 to control cursor location while various times can be used, preferably, the positioning and moving logic is executed once every 0.025 seconds, whereby dt is equal to 0.025 seconds, as previously described.

While a preferred embodiment of the invention has been illustrated and described, it will be appreciated that within the scope of the appended claims various changes can be made therein without departing from the spirit and scope of the invention as defined by the appended claims.

The embodiments of the invention in which an exclusive property or privilege is claimed are defined as follows:

1. A cursor control device for use with a computer-controlled display, comprising:
    (a) a touch-pad controller, including:
        (1) a housing having: (i) a base, (ii) a surface having an upper portion and a lower portion, said lower portion joining the base near a first end of said base, said surface sloping upwardly from said base at an angle greater than 10°, and (iii) a pair of side walls extending from said base to said sloped surface,
        (2) a touch sensitive pad, disposed in said sloped surface, for sensing the location of an object, such as a finger, pressing against said touch sensitive pad;
        (3) a switch mounted in one side wall of said housing, and
        (4) a palm support located at the upper portion of said sloped surface adjacent to an end of said touch sensitive pad for supporting the palm of a hand of a user so that a finger of the hand whose palm is supported by the palm support can be used to operate said touch sensitive surface; and
    (b) interface electronics, coupled to said touch sensitive pad and to said switch of said touch-pad controller for:
        (1) determining the location of an object pressing against said touch sensitive pad;
        (2) determining the status of said switch, and
        (3) producing cursor control signals suitable for controlling the position of a cursor on a computer-controlled display based on said determinations that define the location of said object pressing against said touch sensitive pad and track the movement of said object across said touch sensitive pad.

2. The cursor control device claimed in claim 1, wherein said angle between said surface and said base is greater than 20°.

3. The cursor control device claimed in claim 1, wherein said palm support includes a central axis lying at an angle relative to said sloped surface.

4. The cursor control device claimed in claim 3, wherein said angle between said central axis of said palm support and said sloped surface is at least 10°.

5. The cursor control device claimed in claim 3, wherein said palm rest is hingedly mounted to said housing, so that said angle between said central axis of said palm support and said sloped surface is variable.

6. The cursor control device claimed in claim 1, wherein:
   (a) said touch pad controller also includes display select switch means mounted in said housing adjacent the end of said touch sensitive pad remote from the end adjacent to said palm support;
   (b) said display select switch means is coupled to said interface electronics; and
   (c) said interface electronics determines the status of said display select switch means.

7. The cursor control device claimed in claim 6, wherein said touch pad controller also includes indicating means, associated with said display select switch means, for visually indicating the status of said display select switch means.

8. The cursor control device claimed in claim 6, further comprising a second touch-pad controller, said touch-pad controllers being selectively couplable to a common computer-controlled display.

9. The cursor control device claimed in claim 8, wherein said interface electronics selectively couples said touch-pad controllers to said common computer-controlled display by:
   (a) scanning said display select means of each of said touch-pad controllers for a change in status; and
   (b) determining whether a previously displayed cursor on said common computer-controlled display was associated with the other of said touch-pad controller and if so:
      (1) causing said cursor control signals to remove said previously displayed cursor; and
      (2) then, causing said cursor control signals to display a cursor, associated with said scanned touch-pad controller, at a predefined location on said common computer-controlled display.

10. The cursor control device claimed in claim 1, wherein said switch mounted in the sidewall of said housing has a textured surface to provide tactile feedback to a user that a digit, such as the thumb, of the user's hand, is in contact with said switch.

11. The cursor control device claimed in claim 1, wherein said interface electronics determines the rate of movement of an object, such as a finger, across said touch sensitive pad, and the location of the object, and uses said rate of movement and location information to produce said cursor control signals by:
   (a) scanning said touch sensitive pad to determine the location of the object at a first time and at a second time;
   (b) comparing the object location at said first time with the object location at said second time to obtain a measurement of change in the location of the object;
   (c) determining an approximate rate of change in the location of the object by dividing said measurement of change in the location of the object by a delta time determined by subtracting said first time from said second time;
   (d) determining a gain from a function that is dependent upon said approximate rate of change of the location of the object; and
   (e) multiplying said measurement of the change of location of the object by said gain to produce said cursor control output signals.

12. The cursor control device claimed in claim 11, wherein a constant gain is determined if the absolute value of said measurement of change in the location of the object over a predetermined period of time is less than a predefined value.

13. The cursor control device claimed in claim 11, further wherein:
   (a) said step of comparing the object location comprises the subsets of:
      (1) determining a measurement of change in the location of the object along a first axis of a Cartesian coordinate system by comparing the object location at said first time along said first axis with the object location at said second time along said first axis; and
      (2) determining a measurement of change in the location of the object along the second axis of said Cartesian coordinate system by comparing the object location at said second time along said second axis with the object location at said second time along said second axis;
   (b) said step of determining an approximate rate of change comprises the substeps of:
      (1) determining an approximate rate of change along said first axis of said Cartesian coordinate system by dividing said measurement of change in the location of the object along said first axis by said delta time; and
      (2) determining an approximate rate of change along said second axis of said Cartesian coordinate system by dividing said measurement of change in the location of the object along said second axis by said delta time;
   (c) said step of determining a gain from a function comprises the substeps of:
      (1) determining a first gain from a first function that is dependent upon an absolute value of approximate said rate of change of the location of the object along said first axis of said Cartesian coordinate system; and
      (2) determining a second gain from a second function, dependent upon an absolute value of approximate said rate of change of the location of the object along said second axis of said Cartesian coordinate system; and
   (d) multiplying said measurement of change of location of said object along said first axis of said Cartesian coordinate system by said first gain, and multiplying said measurement of change of location of said object along said second axis of said Cartesian by said second gain to produce said cursor control signals.

14. The cursor control device claimed in claim 13, wherein a constant first gain is determined if the absolute value of said measurement of change in the location of the object along said first axis of said Cartesian coordinate system over a predetermined period of time is less than a predefined value.

15. The cursor control device claimed in claim 13, wherein a constant second gain is determined if said absolute value of said measurement of change in the location of the object along said second axis of said Cartesian coordinate system over a predetermined period of time is less than a predefined value.

16. The cursor control device claimed in claim 1, wherein said interface electronics repositions a cursor in a computer-controlled display by:

(a) scanning said touch-pad controller to determine if said switch has been pressed;

(b) determining whether said cursor is currently displayed within a first predefined area if said switch has been pressed;

(c) determining whether a second predefined area is associated with said first predefined area; and (d) causing said cursor control signals to display said cursor within said second predefined area, if said second predefined area is associated with said first predefined area.

17. The cursor control device claimed in claim 1, wherein said interface electronics controls the location of a cursor upon said computer-controlled display in an absolute mode or in a relative mode, by:

(a) sequentially scanning said touch sensitive pad to determine:
  (1) if the object is in contact with said touch sensitive pad; and
  (2) the location of the object if the object was in contact with said touch sensitive pad;

(b) causing said cursor control signals to reposition a cursor to a predefined location upon said computer-controlled display if said object is located within a predefined area upon said touch sensitive pad during one of said sequential scans and was not in contact with any area of said touch sensitive pad during the immediately preceding sequential scan; and (c) causing said cursor control signals to reposition said cursor upon said computer-controlled display a distance and direction that is proportional to the distance and direction of a change in the location of said object upon said touch sensitive pad that occurs between sequential scans during which said object is in contact with said touch-sensitive surface.

18. The cursor control device claimed in claim 17, further wherein said step of causing said cursor control signals to reposition said cursor upon said computer-controlled display a distance and direction that is proportional to the distance and direction of a change in the location of said object comprises the substeps of:

(a) comparing the object location determined during a scan, with the object location determined during the immediately preceding scan to obtain a measurement of the change in the location of the object;

(b) determining an approximate rate of change in the location of the object by dividing said measurement of change in the location of the object by the time between said sequential scans;

(c) determining a gain from a function that is dependent upon an absolute value of approximate said rate of change of the location of the object; and (d) multiplying said measurement of the change of the location of the object by said gain to produce said cursor control signals.

19. The cursor control device claimed in claim 1, wherein said touch-pad controller is selectively couplable to an individual computer-controlled display of a plurality of related computer-controlled displays.

20. The cursor control device claimed in claim 1, further comprising:

(a) a second touch-pad controller; and (b) a third device having display select means, said interface electronics selectively coupling said touch-pad controllers and said third device to said computer-controlled display.

* * * * *

UNITED STATES PATENT AND TRADEMARK OFFICE
CERTIFICATE OF CORRECTION

PATENT NO. : 5,956,019　　　　　　　　　　　　　　　　　　　　　　Page 1 of 1
DATED : September 21, 1999
INVENTOR(S) : E.S. Bang et al.

It is certified that error appears in the above-identified patent and that said Letters Patent is hereby corrected as shown below:

Column 2,
Line 20 "(30), The" should read --(30). The--

Column 17,
Line 12, "touch pad" should read --touch-pad--
Line 34, "controller" should read --controllers--

Column 18,
Line 31-34, subclause (b)(2) should be double-indented
Line 38, "approximate said" should read --said approximate--
Line 43, "approximate said" should read --said approximate--
Line 51, after "Cartesian" insert --coordinate system--

Column 19,
Line 36, "touch-sensitive" should read --touch sensitive--

Column 20,
Line 9, after "scan" delete ","

Signed and Sealed this

Seventh Day of August, 2001

*Attest:*

*Nicholas P. Godici*

*Attesting Officer*　　　　NICHOLAS P. GODICI
　　　　　　　　　　　　*Acting Director of the United States Patent and Trademark Office*